United States Patent [19]

Sharpe, Jr.

[11] Patent Number: 4,990,262

[45] Date of Patent: Feb. 5, 1991

[54] PREPARATION OF HIGH SOLID MINERAL SLURRIES

[76] Inventor: Andrew J. Sharpe, Jr., Star Rte. 1, Box 130, Comfort, W. Va. 25049

[21] Appl. No.: 310,249

[22] Filed: Feb. 13, 1989

[51] Int. Cl.$^5$ .............................................. C02F 1/56
[52] U.S. Cl. ................................... 210/710; 106/465; 106/487; 209/5; 210/728; 210/734; 210/735; 210/778; 501/148; 524/447
[58] Field of Search ............... 106/288 B, 308 B, 487, 106/465; 209/5; 210/710, 725, 727, 728, 733, 734, 735, 778; 501/148; 524/447

[56] References Cited

U.S. PATENT DOCUMENTS

| | | |
|---|---|---|
| 3,285,849 | 11/1966 | Watanabe et al. ............... 210/735 |
| 3,290,310 | 12/1966 | Morf ................................. 210/735 |
| 3,408,293 | 10/1968 | Dajani et al. ..................... 209/5 |
| 3,484,832 | 12/1969 | Odom et al. ..................... 210/906 |
| 3,753,902 | 8/1973 | Stettler ............................. 210/735 |
| 4,174,279 | 11/1979 | Clark et al. ...................... 501/149 |
| 4,271,028 | 6/1981 | Marfurt et al. .................. 210/727 |
| 4,481,116 | 11/1984 | Cabestany et al. .............. 210/735 |
| 4,647,382 | 3/1987 | Sharpe ............................. 210/734 |
| 4,738,726 | 4/1988 | Pratt et al. ....................... 524/447 |

Primary Examiner—Peter Hruskoci

[57] ABSTRACT

Aqueous mineral slurries are treated prior to dewatering, to increase throughput, with a condensation product of formaldehyde and dicyandiamide, which may be further reacted with ammonia or an ammonia salt and an alkylenepolyamine or copper chloride.

14 Claims, No Drawings

PREPARATION OF HIGH SOLID MINERAL SLURRIES

BACKGROUND OF THE INVENTION

This invention relates to an improved process for flocculating and thickening and/or dewatering aqueous mineral slurries containing 10% or more by weight of solids. More particularly, this invention relates to the use of a polymeric flocculant prepared by the reaction of dicyandiamide and formaldehyde for treating finely divided mineral slurries such as kaolinitic clays, calcium carbonate, calcium sulfate and other finely divided minerals, to filter or otherwise dewater them prior to shipment of the minerals. This invention also relates to the use of the aforementioned polymeric flocculants in combination with polymers containing 2-acrylamido-2-methyl propyl sulfonic acid monomers described in my U.S. Pat. Nos. 4,647,382 and 4,471,838.

Flocculants are reagents which are added to suspensions of solids to cause the solids to agglomerate (or flocculate) into larger particle sizes which settle and/or dewater more efficiently than in their original state. Polymeric water-soluble flocculants may be nonionic, anionic, cationic or amphoteric. The particular type of flocculant to choose in a given application may depend upon the nature of the surface of the suspended solids, the pH of the aqueous slurry, and the desirable or undesirable side effects.

Approximately 5 to 6 million tons of kaolinitic clay are mined, processed and shipped from the southeastern United States per year. The clay is usually mined by the open pit method. It is then slurried in water at about 20–30% solids, dispersed with various combinations of inorganic and organic dispersants to maintain a low viscosity, and processed. Processing includes removal of iron and other magnetic impurities, removal of sand and silt, bleaching for whiteness and brightness, and, finally, dewatering. Dewatering is commonly accomplished by rotary vacuum filters although other methods of dewatering such as pre-thickening, centrifugation, and filtration on pressure filters are feasible. The filter cake obtained from the rotary vacuum filters is, in the present state of the art, usually about 50 to about 60% solids.

Also in the present state of the art, a portion of the filter cake is typically spray dried and blended back with the remaining filter cake to obtain an aqueous slurry containing about 70% solids or more. Additional dispersants may be added to the 70% solid slurry with mixing as needed to obtain a final Brookfield viscosity of less than 1000 cps., and preferably less than 500 cps. This low viscosity, 70% solids slurry is then shipped in bulk to the customer.

My U.S. Pat. Nos. 4,647,382 and 4,741,838 disclose the use of certain anionic polymers of 2-acrylamido-2-methyl propane sulfonic acid, as flocculants which improve the dewatering of mineral slurries and which also enable the ready redispersal of the filter cake to a low viscosity slurry.

While certain organic cationic polymers are known to effectively flocculate pigment slurries, specifically kaolinitic clays, calcium carbonate and calcium sulfate, these products have not been employed commercially in dewatering pigment slurries. The cationic polymers have not been commercially adopted because during subsequent re-dispersal to a high solids, low viscosity slurry the floc formed by state-of-the-art organic cationic polymers will not break down. In fact it has been impossible to satisfactorily redisperse mineral slurries so treated by conventional means.

U.S. Pat. No. 4,217,209 (see particularly col 11, line 53) proposes the use of polymers of dicyandiamide, formaldehyde and ammonium sulfate to remove heavy metal sulfides from dye wastes. It is noteworthy that the above is the only condensation polymer in the list of cationic polymers proposed in Table 3—all the other cationic polymers are chain growth polymers. Even more worthy of note is that there are no performance results reported in '209 for the dicyandiamide formaldehyde and ammonium sulfate polymers, nor are these products included in the claims.

The '209 process is a very specific, multi-step process wherein the waste stream is pretreated with a substantial amount of an absorbent filter aid such as activated charcoal or Celite followed by treatment with a high molecular weight anionic polymer and finally a treatment with a cationic polymer. By contrast the present invention involves a one-step process of adding the cationic polymers described herein to a mineral process stream to obtain flocculation, which may be followed by addition of a particular (AMPS-containing) amionic polymer.

U.S. Pat. No. 4,217,209 is concerned with forming the insoluble sulfides of heavy metals which have an initial concentration of 100–5000ppm in the waste stream and subsequently removing them by flocculation. In further contrast, the instant invention is directed to more efficient dewatering of mineral slurries which contain 10% (100,000 ppm) or more solids prior to dewatering and as high as 50% (500,000 ppm) or more solids after dewatering.

Moreover, the concentrated solids resulting from the practice of the art in '209 is a waste and is simply disposed of in a safe manner. The concentrated solids resulting from the practice of the instant invention, conversely, are a product to be sold commercially. The high level of absorbent material which is an integral part of the '209 process would certainly be detrimental to product quality. Celite would without doubt lower the brightness, etc. of the mineral products of the present invention; the activated charcoal being black would surely cause the white mineral products to be unsaleable.

Finally, the concentrated solids resulting from the instant invention (usually 50–60% solids) are normally supplemented with dry mineral to bring the solids to 60–70% which must then be redispersed to a low-viscosity (usually less than 500 cps) slurry, There is no indication the concentrated solids from '209 are even near the 50% or more normally obtained in the practice of the present invention, nor is there any reason or need within the teachings of '209 to add solids to increase their concentration.

U.S. Pat. No. 4,271,028 discloses the use of condensation polymers of dicyandiamide with formaldehyde and related polymers for removal of protein type material from waste streams. However, upon reading '028, it is obvious that the dosages required to obtain satisfactory flocculation are enormous: 3000 to 6000 ppm based on the total liquid waste stream. If one calculates these dosages on a lbs./ton basis, based on example 1 of '028 the dosage range is 3600 to 7200 lbs. (active) of the condensation polymer per ton of influent solids. Comparatively, the dosages of the condensation polymer for purposes described herein are 0.5 to 250 ppm based on the total liquid sample (wherein the solids are 10%) or 0.01 to 5.0 lbs./ton. Differences of this magnitude are clearly indicative of patenably distinct processes. Further, the dosages necessary to practice the teachings of '028 are totally beyond the realm of acceptability from a practical, technical or economic standpoint for the use described in the instant invention.

Second, the use of a multivalent metal ion as a co-coagulant is necessary in order to successfully practice the process described in the '028 patent. In examples 1 and 3, an electrolytic process which utilizes a sacrificial electrode to provide $Al^{+3}$ ions is an integral part of the treatment process. Example 3 clearly states that the $Al^{+3}$ ion is necessary to obtain good flocculation. In example 2, the only example which does not include the $Al^{+3}$ producing step, the multivalent nickel ion is already contained in the waste stream being treated. Further, although the dosage of $Al^{+3}$ ions in Examples 1 and 3 cannot be calculated from the available data, the 1600 ppm of nickel ion in Example 2 strongly indicated that the necessary dosage of multivalent metal ion is also extremely high. Even further, the claims are written to a process which includes the electrolytic process.

Finally, there is again no need to prepare a high solids, low viscosity slurry from the "dewatered" solids. There is also no reason to anticipate that such would be possible if one attempted to do so. In fact, the solids in any slurry prepared from the "dewatered" solids of '028 would be predominently polymer and aluminum or nickel compounds.

Further, the prior art specific to use of the condensation polymers of dicyandiamide and formaldehyde gives no indication that these products would be effective flocculants or thickeners of any materials at ordinary dosages or in the absence of large dosages of an inorganic coagulant. In fact, the dosages employed in examples of the prior art showing these polymers were so extremely high as to actually teach away from consideration of these products as flocculants for mineral slurries, where large volumes of slurries are treated.

SUMMARY OF THE INVENTION

The present invention employs certain polymeric, cationic flocculants for thickening and/or dewatering aqueous pigment, kaolinitic clay, or other mineral slurries containing 10% by weight or more pigment, kaolinitic clay or mineral (collectively mineral) solids. Because of my choice of flocculating materials, and in contrast to prior art teachings, the flocculated mineral may be redispersed after the dewatering process with conventional additives such as inorganic and/or low molecular weight organic anionic polymeric dispersants with mixing.

The cationic polymers employed in the instant invention provide significantly increased throughput with, at most, an insignificant effect on the solids content in the product slurries of the dewatering operation. Further, contrary to prior experience with cationic organic polymers, use of the cationic flocculants of the instant invention does not preclude subsequent redispersal, and still further, has only a negligible effect on the viscosity of the final, redispersed product. One skilled in the art will recognize that these results are highly surprising and unexpected.

A further advantage of using the cationic organic polymers of the instant invention is the ability to reduce or eliminate the use of alum (aluminum sulfate) as a coagulant. The end use of some grades of minerals requires that the content of inorganic metal salts such as alum, be minimized. Thus, the use of the polymers of the instant invention allows the production of a more desirable mineral product for certain end uses.

The cationic flocculants I use are polymeric condensation products of formaldehyde, dicyandiamide, and, preferably, an ammonium salt, ammonia, or an alkylene polyamine and optionally a metallic salt, as defined hereafter.

The present invention also uses the afore described cationic flocculants in conjunction with treatment with anionic polymers containing 2-acrylamido-2-methyl propyl sulfonic acid ("AMPS") ® or its water soluble or dispersible salts to further improve dewatering. The anionic "AMPS" containing polymers are, for example, those described in my U.S. Pat. Nos. 4,647,382 and 4,471,838, which are incorporated herein by reference. One skilled in the art will recognize that it is extremely unexpected to discover a cationic polymer which will improve dewatering of mineral slurries without exerting an unacceptable detrimental effect on the final viscosity. It will also be recognized that it is even more unexpected to discover an anionic polymer which may be used in conjunction with said cationic polymer to obtain improved dewatering and which combination does not exert an unacceptable effect on the final product viscosity.

"AMPS" is a registered trademark of Lubrizol Corp. Wickliffe, Ohio.

DETAILED DESCRIPTION OF THE INVENTION

The instant invention employs cationic flocculants which effectively enhance the dewatering operations during the processing of mineral slurries, while having only minimal effect on the final viscosity of the slurry after redispersal. The ability to effect dewatering without a significant adverse result in the redispersal step is totally contrary to previous experience with the use of cationic flocculants in mineral slurries. The process of the instant invention provides significantly increased throughput with little or no detrimental effect on product solids or vice versa depending on filter operating conditions. My process has shown surprising utility in dewatering kaolin clay slurries. These same advantages may be realized in processing other kaolinitic clays, calcium carbonate, and in other operations where finely divided solids must be dewatered.

The flocculants employed in the instant invention are polyamides which can adopt a cationic charge in aqueous systems. The polymers I employ for the practice of this invention are water soluble or water dispersible polyamides—specifically formaldehyde-dicyandiamide condensation products. Preferably the condensation products are prepared from formaldehyde, dicyandiamide and one or more of the following components: urea, ammonia, an ammonium salt and/or an alkylene polyamine. The polyamine, if used, may contain from 2 to 24, preferably from 2 to 8, carbon atoms and from 2 to 5 amino groups.

The alkylenepolyamines may be, for example, ethylene diamine, propylene diamine, butylene diamine, pentylene diamine, hexamethylene diamine, diethylene triamine, triethylene tetraamine, 1,2-propylene diamine, dipropylene triamine, tripropylene tetramine, dihydroxy dipropyl triamine, dibutylene triamine, tributylene tetraamine, tetrabutylene pentamine, dipentylane triamine, tripentylene tetraamine, tetrapentylene pentamine, dihexamethylene triamine, trihexamethylene tetramine and tetrahexamethylene pentamine.

Suitable polyamides may be prepared simply by reacting formaldehyde and dicyandiamide, or formaldehyde, dicyandiamide and urea. Generally more preferred polyamides may be prepared from formaldehyde, dicyandiamide and one or more of the following: ammonia, an ammonium salt, or an alkylene polyamine. The most suitable polyamides may be prepared from formaldehyde, dicyandiamide and ammonium chloride. Optionally a water soluble copper salt may be added to the reaction mixture.

Preferred products are obtained, for example, by reaction of from 1.8 to 3.6 moles of formaldehyde, 0.5 to 1.2 moles of dicyandiamide and 0.5 to 1.0 mole or more of ammonium chloride. If desired, 0.1 to 1.5 moles of an alkylenepolyamine as recited above, preferably ethylene diamine, can be additionally used. Optionally, up to 1.0 mole or more of a copper salt, eg $CuCl_2$ may be added per mole of dicyandiamide.

Typical examples of the polymers useful in the practice of this invention are

A. Reaction product of
1 mole of dicyandiamide
2 moles of formaldehyde
1 mole of ammmonium chloride
B. Reaction product of
1 mole of dicyandiamide
2 to 2.2 moles of formaldehyde
0.8 moles of ammonium chloride
0.1 moles of ethylene diamine
C. Reaction product of
1 mole of dicyandiamide
2 moles of formaldehyde
1 mole of ammonium chloride
1 mole of copper chloride
D. Reaction product of
3 to 4 moles of dicyandiamide
7 moles of formaldehyde
1 mole of the tetrahydrochloride of triethylene tetramine The above illustrative compositions are not to be considered limiting of my invention. Typical, but non-limiting, processes for the preparation of the compositions I employ are described below.

In any of the compositions described herein, up to about 50% of the formaldehyde may be replaced by other suitable aldehydes such as glyoxal. Up to about 50% of the dicyandiamide may be replaced by other suitable multifunctional diamides.

A general description of conditions for the condensation is as follows.

One mole of dicyandiamide is mixed with at least 1.5 moles of 30% aqueous formaldehyde and heated to 80°-90° C. with agitation. The reaction mixture is maintained at 80°-90° C. with stirring for approximately two hours after which time it may be cooled and diluted to a slightly viscous, 50% aqueous solution which is the condensation polymer.

Alternatively, the reaction mixture may be treated with up to two moles, preferably about one mole of ammonium chloride and, optionally, up to about one mole of copper chloride and maintained at reflux for one to two hours to form the more cationic derivative of the polymer. The product may than be cooled and diluted to 50% active concentration with water.

There are numerous processes suitable for making the cationic condensation products of the instant invention. For example, one mole of dicyandiamide may be reacted with one mole of 30% aqueous formaldehyde for a few minutes at 80°-90° C. to form the methylol derivative. The methylol derivative may then be reacted with one mole of ammonium chloride for two hours or so to form the cationic, methylol dicyandiamide derivative. The latter is then reacted with an excess (for example, from about 1.5 to about 3.5 moles) of formaldehyde at 80°-90° C. for about two hours to form the condensation polymer.

An alternative process for making a condensation polymer of dicyandiamide and formaldehyde, which contains a polyamine, is as follows. One mole of dicyandiamide is mixed with 2.2 moles of formaldehyde in 30% solution and 0.8 moles of ammonium chloride with agitation. Then 0.125 moles of ethylene diamine is added dropwise while allowing the reaction mixture to exotherm to 80°-90° C. The reaction is held at 80°-90° C. for at least 10 minutes, allowed to cool and diluted to 50% active aqueous solution.

The foregoing specific examples of compositions should not be construed as limiting the scope of the instant invention. The most preferred polymers is those of dicyandiamide, formaldehyde and a readily soluble ammonium salt such as ammonium chloride or ammonium sulfate.

While there is no reason to believe that even very small amounts of the cationic polymers described above will not have at least some beneficial effect, a practical effect may not be perceived at levels of below about 0.02 pounds of active cationic polymer per ton of solids in the slurry; accordingly I prefer to use at least about 0.02 pounds of active polymers per ton of slurry solids. On the other hand, concentrations higher than about five pounds active cationic polymer per ton may not be expected to improve the process at an economic rate; accordingly I prefer not to use more than about five pounds of active cationic polymer per ton.

Another facet of the present invention is the use of the afore described cationic polymers in combination with "AMPS" ® containing anionic polymers for improved dewatering of the previously described mineral slurries. The said anionic "AMPS" ® containing polymers are water soluble or water dispersible polymers which contain from 1% to 100% by weight, 2-acrylamido-2-methyl propyl sulfonic acid and/or the neutralized salts thereof. Typically the "AMPS" containing polymers will be substantially either "AMPS" homopolymers and/or "AMPS" copolymers with, for example, acrylamide, generally having a Brookfield viscosity of 10,000 cps or more as a 7% active aqueous solution. While up to about 5.0 pounds of active "AMPS" containing polymer may be used per ton of solids with the above described cationics, I prefer to use from about 0.01 to about 3.0 pounds per ton based on the weights of the solids to be treated.

EXAMPLES

Standard laboratory filter leaf tests were completed to demonstrate the improved filter operation attainable. As is known in the art, the filter leaf test employs a hollow, more or less conical plastic device which is connected to a vacuum pump or aspirator and which is covered with a piece of filter cloth, preferably the same type of cloth used commercially for the slurry being tested.

The filter leaf is immersed in a container of slurry for a predetermined number of seconds, preferably the approximate time of immersion on the commercial filter, while under vacuum to draw the slurry to the cloth. The filter leaf is then inverted for another predetermined time under vacuum to dry.

The cake obtained on the cloth is then scraped into a tared container and weighed; the cake is then dried overnight in an oven at a standard temperature, e.g. 105° C., and reweighed. The yield of wet filter cake from the lab filter is determined in grams per square inch. This result is converted to pounds per square foot to predict performance on the full scale filter. Cake solids are calculated from the dry weight and wet weight of the collected filter cakes. The cakes from 4 filter leaf evaluations are combined to obtain each result listed below. The results are combined to improve the statistical reliability of the data. This procedure was followed in the experiments described below.

In Table I, "bowl" weights and "bowl plus clay" weights are expressed in grams. The yield of pounds per square foot per hour was calculated from the lab filter yield which is in terms of grams per square inch taking into account the known revolutions per hour and total square footage of filter area for the full scale commercial filter. Determinations were completed for the control and each polymer dosage. A very fine (very small particle size, e.g. 97% <2 micron) grade of kaolin clay which is extremely difficult to filter was used in these evaluations.

COMPARISON EXAMPLE I

A strongly cationic polymer, polydiallyldimethylammonium chloride was used in the following evaluations. This product is typical of commercially available cationic products. The specific polyDADMAC used in this work was Perchem 553, a product of Chem-link, which is 20% active and has a Brookfield viscosity of approximately 100-200 cps. This product was designated AJS-31B. Other conditions for these evaluations are summarized below.

| | |
|---|---|
| feed solids | 28.70 |
| feed temperature | 70.00 |
| feed pH | 3.09 |
| inches vacuum | 25.00 |
| CFM cloth | 3.50 |
| backing | closed knit |
| % submergence | 30.00 |
| filter RPH | 45.00 |

TABLE I

| Chemicl[a] Dosage | Bowl wt. | Bowl + wet clay | Bowl + dry clay | Yield lb/ft²/hr | Yield ton/hr | Cake solids |
|---|---|---|---|---|---|---|
| 1.0 lb/ton AJS-31B | 141.80 | 248.90 | 204.80 | 19.94 | 15.22 | 58.82 |
| 2.0 lb/ton AJS-31B | 154.40 | 280.50 | 226.50 | 22.82 | 17.42 | 57.18 |
| 2.0 lb/ton alum | 152.40 | 244.80 | 208.20 | 17.66 | 13.48 | 60.39 |
| Control | 147.20 | 215.50 | 189.80 | 13.48 | 10.29 | 62.37 |

[a]
1. All slurry samples were pretreated with 4.5 lbs/ton sulfuric acid.
2. Slurry samples treated with AJS-31B were not treated with alum.
3. Control was not treated with alum or AJS-31B.

The filter cake from the four experiments in Table I were redispersed in the laboratory to simulate preparation for shipment. The weighed, dried filter cake from each experiment was added to sufficient water and dispersant to obtain approximately 70% clay solids. The level of dispersant ("60-40", a mixture of 60% soda ash and 40% of a 43% solution of low molecular weight polyacrylic acid) is noted in Table II. The mixture was then placed on a Hobart lab mixer and mixed for 10 minutes. The Brookfield and Hercules viscosity of the redispersed slurry was then measured and recorded. Brookfield viscosity was measured using Spindle 1 RV and 20 rpm; Hercules viscosity was measured using the A Bob.

TABLE II

| Flocculant lbs/ton | Dispersant lbs/ton | % solids | Brookfield viscosity | Hercules dynes/rpm |
|---|---|---|---|---|
| 1.0 AJS-31B | 4.5 | 70.0 | 5800 cps | 18.0/610 |
| 2.0 AJS-31B | 4.5 | 70.1 | too high off-scale | 18.0/292 |
| 2.0 Alum | 4.5 | 69.9 | 200 cps | 11.8/1100 |
| Control | 4.5 | 70.5 | 222 cps | 7.1/1100 |

The results presented in Table I clearly show that conventional, commercially available cationic polymers (flocculant) will, as expected, provide improved filterability for a mineral slurry, specifically in this case, a kaolin clay slurry. However the data in Table II dramatically illustrate why the commonly available cationic polymers are not used to improve filterability of high solids mineral slurries which must be redispersed to a low viscosity for spray drying or for subsequent sale as a very high solids slurry. To further emphasize this point, a general rule of thumb used in the Kaolin clay industry is that if the redispersal viscosity at 70% solids exceeds 350 cps Brookfield or 14.0 dynes Hercules at 1100 rpm there is cause for concern. Obviously both viscosities obtained with the poly DADMAC are totally unacceptable.

EXAMPLE II

A cationic polymer typical of those described by this invention, a low molecular weight condensation polymer derived from the reaction of approximately one mole of dicyandiamide, two moles of formaldehyde and one mole of ammonium chloride was used in the following evaluations. The product had a Brookfield viscosity of approximately 100 cps at 50% active solids as an aqueous solution and was designated AJS-SF50. Other conditions for these evaluations are summarized below.

| | |
|---|---|
| feed solids | 34.3% |
| feed temperature | 70° F. |
| feed pH | 3.5 |
| inches vacuum | 24 |
| CFM cloth | 3.5 |
| backing | closed knit |
| % submergence | 30 |
| filter rph | 45 |

TABLE III

| Polymer[a] Dosage | Bowl Wt. | Bowl + wet Clay | Bowl + dry Clay | Yield lb./ft.²/hr | Yield tph | Cake Solids |
|---|---|---|---|---|---|---|
| Control | 147.2 | 244.7 | 209.0 | 19.58 | 14.95 | 63.38 |
| 1.0 lb./t AJS-SF50 | 144.6 | 263.0 | 217.3 | 23.03 | 17.58 | 61.40 |
| 3.0 lb./t | 154.3 | 292.5 | 237.4 | 26.32 | 20.10 | 60.13 |

TABLE III-continued

| Polymer[a] Dosage | Bowl Wt. | Bowl + wet Clay | Bowl + dry Clay | Yield lb./ ft.$^2$/hr. | Yield tph | Cake Solids |
|---|---|---|---|---|---|---|
| AJS-SF50 2.0 lb./t | 152.4 | 246.4 | 212.8 | 19.13 | 14.61 | 64.26 |
| Alum 2.0 lb./t AJS-SF50 | 141.7 | 266.5 | 218.3 | 24.26 | 18.53 | 61.38 |

[a]
(1) All slurry samples were pre-treated with 4.5 lb./ton sulfuric acid.
(2) Slurry samples treated with AJS-SF50 were not treated with alum.
(3) Control was not treated with polymer or alum.

It is clear from the above results that very large increases in filter throughput are obtainable by using moderate dosages of AJS-SF50, a low molecular weight, cationic polyamide made by reacting two moles of formaldehyde with one mole of dicyandiamide and one mole ammonium chloride and one mole of copper chloride. For example, a dosage of 3.0 lbs./ton resulted in a 34+% increase in throughput (yield).

On a commercial scale filter the percent immersion (submergence) and rph may be adjusted to obtain higher cake solids while retaining a significant portion of the throughput increase.

The filter cake from the 3rd and 4th experiments in Table III were redispersed in the laboratory to simulate preparation for shipment. The weighed, dried filter cake from each experiment was added to sufficient water and dispersant to obtain a slurry of approximately 70% clay solids. The level of dispersant "60-40", (a mixture of 60% soda ash and 40% of a 43% solution of low molecular weight polyacrylic acid sodium salt) is noted in Table IV. The mixture was then placed on a Hobart lab mixer and mixed for 10 minutes The Brookfield and Hercules viscosity of the redispersed slurry was then measured and recorded. Brookfield viscosity was measured using Spindle 1 RV and 20 rpm; Hercules viscosity was measured using the A Bob.

TABLE IV

| Flocculant | Dispersant lb./ton 60–40 | % solids | Brookfield cps | Hercules Dynes/RPM |
|---|---|---|---|---|
| 2.0 lb./t AJS-SF50 | 4.5 | 70.1 | 197.5 | 11.6/1100 |
| 2.0 lb./t Alum | 4.5 | 69.8 | 160 | 8.4/1100 |

The results reported in Table IV clearly demonstrate that the use of the cationic flocculants of the instant invention do not preclude redispersal of the filter cake to obtain a high solids (i.e. 70%) slurry which exhibits low viscosity; by contrast, the prior art would predict that a cationic flocculant used in the dewatering operation would prevent redispersal as may be concluded from Example I. In fact the results show that the cationic flocculants of the instant invention exert only a very minimal effect on redispersal. My invention thus includes a new composition of matter, which is a high (50% or more) solids mineral slurry including at least about 0.02 pounds of the cationic polymer described herein per ton of solids and optionally up to about 5 pounds of 2-acrylamido-2-methyl propylsulfonic acid, as will be explained below. As shown herein, such a slurry is readily redispersible.

EXAMPLE III

Further work was completed with AJS-SF-50 to determine the approximate dosage needed to provide performance equal to that obtained with 2.0 lbs./ton alum. Evaluation procedures were the same as described earlier. Note that this work was completed on a different seam of clay wherein the viscosity specifications were more difficult to achieve. Other conditions for these evaluations are summarized below:

| | |
|---|---|
| feed solids | 24.50 |
| feed temperature | 75.00 |
| feed pH | 3.82 |
| inches vacuum | 25.00 |
| CFM cloth | 3.50 |
| backing | closed knit |
| % submergence | 30.00 |
| filter rph | 45.00 |

TABLE V

| Polymer[a] Dosage | Bowl Wt. | Bowl + wet Clay | Bowl + dry Clay | Yield lb./ ft.$^2$/hr. | Yield tph | Cake Solids |
|---|---|---|---|---|---|---|
| Control (none) | 177.10 | 246.90 | 218.10 | 12.98 | 9.91 | 58.74 |
| 2 lb./ton Alum | 179.40 | 259.00 | 224.50 | 14.27 | 10.90 | 56.66 |
| 0.25 lb./ton AJS-SF50 | 197.40 | 276.00 | 242.30 | 14.21 | 10.85 | 57.12 |
| 0.50 lb./ton AJS-SF50 | 178.20 | 263.00 | 226.10 | 15.16 | 11.57 | 56.49 |

[a]
(1) All slurry samples were pre-treated with 4.5 lb./ton sulfuric acid.
(2) Slurry samples treated with AJS-SF50 were not treated with alum.
(3) Control was not treated with AJS-SF50 or alum.

The results in Table V clearly illustrate that approximately 0.25 lb./ton of AJS-SF50 provides performance equal to that obtained from 2.0 lbs./ton of alum. Note that these dosages are reported on an "as received" basis and both products are 50% solids. Thus, the clay can be dewatered using approximately one eighth (⅛) the chemical dosage normally employed. Further AJS-SF50 is an organic material which does not contribute metallic ions to the clay product. The latter is an important criterion for some applications of the clay product.

The filter cakes from the experiments in Table V were redispersed in the laboratory to simulate preparation for shipment. The weighed, dried filter cake from each experiment was added to sufficient water and dispersant to obtain approximately 70% clay solids. The level of "60/40" dispersant is noted in Table VI. The mixture was then placed on a Hobart lab mixer and mixed for 10 minutes. The Brookfield and Hercules viscosity of the redispersed slurry was then measured. Brookfield was measured using Spindle 1 RV at 20 rpm; Hercules viscosity was measured using the A Bob.

TABLE VI

| Flocculant Dosage | Dispersant lb./ton 60/40 | % Solids | Brookfield Viscosity cps | Hercules Dynes/ RPM |
|---|---|---|---|---|
| Control (none) | 4.5 | 70.4 | 284 | 18/925 |
| 2.0 lb./ton Alum | 4.5 | 70.5 | 319 | 18/842 |
| 0.25 lb./ton AJS-SF50 | 4.5 | 70.4 | 310 | 18/870 |
| 0.50 lb./ton AJS-SF50 | 4.5 | 70.3 | 430 | 18/770 |

The clay used in the foregoing example was from a seam which is difficult to disperse. Under plant operational conditions, more "60/40" would be added as needed to bring the viscosities to specification. However, it is obvious from the results in Tables V and VI that a performance-equivalent dosage of AJS-SF50 has even less effect on viscosity than does the traditionally used alum.

EXAMPLE IV

Additional evaluations were completed to determine the compatability of AJS-SF50 with the anionic polymers described in U.S. Pat. Nos. 4,647,382 and 4,471,838 for the purpose of dewatering mineral slurries. Evaluation procedures were the same as those described earlier. Other conditions for these evaluations are summarized below:

| | |
|---|---|
| feed solids | 28.40 |
| feed temperature | 75.00 |
| feed pH | 3.50 |
| inches vacuum | 25.00 |
| CFM cloth | 3.50–4.50 |
| backing | closed knit |
| % submergence | 30.00 |
| filter rph | 45.00 |

TABLE VII

| Chemical[a] Dosage lbs./ton | Bowl Wt. | Bowl + wet Clay | Bowl + dry Clay | Yield lb./ft.$^2$/hr. | Yield tph | Cake Solids |
|---|---|---|---|---|---|---|
| 0.25 AJS-SF50 0.30AJS-28 | 178.10 | 271.30 | 233.20 | 17.44 | 13.31 | 59.12 |
| 0.50 AJS-SF50 0.30 AJS-28 | 178.10 | 279.20 | 236.90 | 18.61 | 14.21 | 58.16 |
| 0.75 AJS-SF50 0.30 AJS-28 | 179.70 | 292.90 | 244.50 | 20.51 | 15.66 | 57.24 |
| 2.0 Alum 0.3 AJS-28 | 179.40 | 271.20 | 234.20 | 17.34 | 13.24 | 59.69 |
| 2.0 Alum | 185.70 | 274.60 | 237.00 | 16.23 | 12.40 | 57.71 |

[a]
(1) All slurry samples were pre-treatad with 4.5 lb./ton sulfuric acid.
(2) Slurry samples treated with AJS-SF50 were not treated with alum.
(3) The first four samples were treated with AJS-SF50 or alum as indicated then mixed well and subsequently treated with AJS-28 which is a high molecular weight 100% AMPS polymer at the indicated dosage (AJS-28 is ca. 30% active polymer in emulsion form).

The results in Table VII clearly show that AJS-SF50 may be used in conjunction with the anionic polymers of U.S. Pat. Nos. 4,647,382 and 4,741,838 to obtain improved dewatering. Further, 0.25 lbs./ton of AJS-SF50 followed by 0.3 lbs /ton of AJS-28, the anionic AMPS polymer, is essentially equal to 2.0 lbs./ton of alum followed by 0.3 lbs./ton of AJS-28. Even further, both provide substantially better throughput and cake solids than alum alone. While any economic amount of the polymers containing 2-acrylamido-2-methyl propyl sulfonic acid may be used, I prefer to use between about 0.01 and 5.0 lbs of active polymer per ton of solids and, more preferably, from about 0.02 to about 3.0 lb./ton solids.

The filter cakes from the experiments in Table VII were redispersed in the laboratory according to the previously described procedure to simulate preparation for shipment.

TABLE VIII

| Chemical Dosage | Dispersant lb./ton 60/40 | % solids | Brookfield Viscosity cps | Hercules Viscosity Dynes/RPM |
|---|---|---|---|---|
| 0.25 AJS-SF50 0.30 AJS-28 | 4.5 | 70.4 | 330 | 14.3/1100 |
| 0.50 AJS-SF50 0.30 AJS-28 | 4.5 | 70.5 | 290 | 17.0/1100 |
| 0.75 AJS-SF50 0.30 AJS-28 | 4.5 | 70.2 | 320 | 18/1032 |
| 2.0 Alum 0.30 AJS-28 | 4.5 | 70.2 | 276 | 16/1100 |
| 2.0 Alum | 5.0 | 70.2 | 260 | 13.9/1100 |

From the data in Tables VII and VIII it may be seen that a performance equivalent dosage of AJS-SF50 and AJS-28 has about the same effect on final product viscosity as alum (the commonly used coagulant in the clay industry) in conjunction with AJS-28. Further, the viscosity results are within the normally acceptable range of final viscosity.

One skilled in the art will recognize that it is very surprising to discover a cationic polymer which can improve the dewatering of high solids mineral slurries (particularly kaolinitic clay slurries) without exerting drastic, unacceptable effects on the final product viscosity. It is extremely surprising, almost unbelievable, to discover a combination of a cationic polymer followed by an anionic polymer which may be used to improve dewatering which does not subsequently have an unacceptable effect on final product viscosity.

I claim:

1. Method of treating an aqueous mineral slurry to obtain improved dewatering, and a final solids content of at least about 50% said slurry containing at least 10% or more finely divided mineral solids, comprising adding thereto an at least about 0.02 pound of a low molecular weight condensation polymer comprising essentially of the reaction product of one mole of dicyandiamide with about 1.5 to about 3.5 moles of formaldehyde, about 0.5 to about 1.0 mole of ammonia or a soluble ammonia salt, up to about a mole of a polyalkylene polyamine, and up to about a mole of a multivalent metal salt per ton of solids in said slurry, dewatering said slurry, and redispersing said slurry with sufficient water and dispersant to a solids content of at least 50% and a final Brookfield viscosity of less than 1000 cps.

2. Method of claim 1 wherein the ammonium salt is ammonium chloride and/or ammonium sulfate.

3. Method of claim 1 wherein the alkylene polyamine is ethylene diamine.

4. Method of claim 1 wherein the multivalent metal salt is a copper salt.

5. Method of claim 1 wherein the condensation polymer is a condensation product of dicyandiamide, formaldehyde ammonium chloride, and copper chloride.

6. Method of claim 1 wherein the mineral slurry is a kaolinitic clay.

7. Method of claim 1 wherein the mineral slurry is calcium carbonate.

8. Method of claim 1 wherein the slurry is dewatered in the presence of at least about 0.01 pound of a polymer containing at least about one percent of 2acrylamido-2-methyl propyl sulfonic acid or a neutralized salt thereof per ton of solids in said slurry.

9. Method of processing minerals for shipment comprising (a) forming a slurry of at least 10% finely divided mineral in water,
(b) adding to said slurry about 0.02 to about 5 pounds per ton of solids therein, of a condensation polymer comprising the reaction product of about 1.5 to about 3.5 moles of formaldehyde, about 0.5 to about 1.0 mole of ammonia or a readily soluble ammonium salt, up to about a mole of copper chloride, up to about 1.5 moles of a polyalkylene polyamine, and about a mole of dicyandiamide,
(c) filtering said slurry and
(d) redispersing said slurry with sufficient water and dispersant to a solids content of at least 50% and a final Brookfield viscosity of less than 1000 cps.

10. Method of claim 9 wherein the condensation polymer is a reaction product including about 1 mole of ammonium chloride for each mole of dicyandiamide.

11. Method of claim 9 wherein the condensation polymer of formaldehyde and dicyandiamide includes ethylene diamine as a reactant.

12. Method of claim 9 wherein the mineral is kaolin clay.

13. Method of claim 9 wherein the mineral is calcium carbonate.

14. Method of claim 9 wherein the slurry is filtered also in the presence of at least about 0.01 pound of a water-soluble polymer including at least one percent 2-acrylamid-2-methyl propyl sulfonic acid or a neutralized salt thereof per ton of solids in said slurry.

* * * * *